United States Patent [19]

DiBartolo

[11] Patent Number: 4,577,831
[45] Date of Patent: Mar. 25, 1986

[54] CALIBRATED HANDKNOB ASSEMBLY

[75] Inventor: Ernest A. DiBartolo, Sarasota, Fla.

[73] Assignee: Sun Hydraulics Corporation, Sarasota, Fla.

[21] Appl. No.: 718,784

[22] Filed: Apr. 1, 1985

[51] Int. Cl.[4] ............................................. F16K 35/06
[52] U.S. Cl. ................................... 251/93; 16/121; 137/385; 251/95; 251/111; 251/114; 251/205; 251/297; 403/1; 403/320
[58] Field of Search ................... 16/110 R, 117, 118, 16/121; 251/93, 95, 96, 111, 114, 205, 297; 137/385; 403/1, 320

[56] References Cited

U.S. PATENT DOCUMENTS

| | | | |
|---|---|---|---|
| 2,234,052 | 3/1941 | Luenz | 251/95 |
| 3,442,361 | 5/1969 | Hegar | 403/1 |
| 3,557,833 | 1/1971 | Gilmont | 251/205 |
| 3,910,553 | 10/1975 | Boylan | 251/205 |
| 4,019,534 | 4/1977 | Clements et al. | 251/205 |
| 4,099,703 | 7/1978 | Lush | 251/205 |
| 4,230,300 | 10/1980 | Wiltse | 251/205 |
| 4,332,369 | 6/1982 | Gordon et al. | 251/114 |
| 4,365,696 | 12/1982 | Telford | 403/1 |

Primary Examiner—G. L. Walton
Attorney, Agent, or Firm—Raymond H. Quist; Charles J. Prescott

[57] ABSTRACT

A calibrated handknob assembly for use with a valve having a control stem, said assembly having a rising stem with spaced circumferential calibrations, a handknob having circumferentially spaced radial calibrations, a lock ring having an index cooperating with said handknob calibrations and having positions for permitting setting of the handknob "zero" position and index position at a desired circumferential location, for placing the assembly in a condition where the handknob cannot be rotated and for permitting rotation of the handknob to change the valve opening. An O-ring is used to detent the lock ring so that inadvertent rotation of the handknob will not occur and to prevent movement of the lock ring to the position where the handknob can be removed and "0" calibration reset. The O-ring may be easily removed to permit the resetting when needed.

16 Claims, 10 Drawing Figures

CALIBRATED HANDKNOB ASSEMBLY

BACKGROUND OF THE INVENTION

1. Field of the Invention

This invention relates generally to handknobs for hydraulic valves, and more particularly to a calibrated handknob having a zero reset feature.

2. Description of the Prior Art

Calibrated handknobs for hydraulic valves are not uncommon. They come in many forms and most are effective in indicating how many turns and fractions of a turn a valve is open. Typically, as the valve is opened by turning the knob, the knob rises with the valve stem and as the knob rises, the knob skirt uncovers calibration marks on a stationary band. An example of this type of calibrated knob is found on the micrometer used by the machinery trades.

Another popular style of calibrated handknob employs a rising stem and non-rising knob. In this style turns are indicated on a read-out column that extends past the outer end of the operating knob, and fractions of a turn are generally indicated by radially spaced lines on the knob skirt which relate to a fixed indicator on the valve body or a stationary band. An enhancement of this style is the use of differential threads to multiply the read-out column movement which make it easier to read. This is an effective modification, but it entails additional expense.

In addition to the foregoing types, there are other calibrated handknobs, but they are apt to be more complex and costly to build. In any event, all of the available designs lack one or more of the following desirable features:

1. Disassembly and reassembly in the field without special tools.
2. Detented locked and unlocked positions (usually a screw in the turning handknob or a nut on a stationary threaded band are used to lock the adjustment).
3. An inexpensive, elastomeric means for protecting the assembly from a dirty environment.
4. Knob retention without the use of threaded fasteners. Retention is important to assure that the knob is not inadvertently pulled off the assembly during use.
5. A means for adjusting the zero position for most convenient viewing.
6. A simple, inexpensive design consisting of few parts that are made by low cost production processes.

It is therefore an object of this invention to provide a calibrated handknob which will incorporate all of the foregoing desirable features

SUMMARY OF THE INVENTION

The handknob assembly includes a stem having axially spaced, circumferential calibrations at one end and means to secure it to a valve control stem at the other end. An intermediate portion is splined so that it will rotate when the handknob is turned. This splining may be conveniently accomplished by forming a twelve-point socket in the handknob and machining the stem from hexagonal stock. The calibrations are uncovered, seriatim, for each full turn of the handknob as the valve is opened. The handknob has ten circumferentially spaced numbered calibrations on its outer surface and the spaces between these graduations are further subdivided by lines on the handknob skirt which are used in conjunction with an index to indicate fractional turns of the handknob. The handknob has axially extending fingers which terminate in inwardly extending lugs. These lugs fit into a groove on the fixed body of the valve and thereby prevent the handknob from being accidentally pulled off. The lugs can be cammed out of this groove but are prevented from being moved out accidentally by a lock ring which holds them in place.

The lock ring is prevented from rotation by a first inner serrate edge which is engaged with an external serrate edge on the fixed valve body. The lock ring can be moved to a first position where a second internal serrate edge engages an external serrate edge on the handknob so that rotation of the handknob is prevented to guard against inadvertent change in the valve opening. Further protection against inadvertent change is provided by detenting the lock ring in this position.

The lock ring can be moved to a second position past the detent to a stop. In this position the handknob serrate edge is not engaged, permitting the valve opening to be changed by rotating the handknob. The index, previously referred to, is provided on the periphery of the fixed lock ring.

The lock ring can be moved to a third position by first removing the O-ring which serves as the detent and stop. In this third position the two serrate edges of the lock ring are disengaged permitting the lock ring to be rotated relative to both the fixed valve control body and the handknob in order to set a new "zero" position of the index.

Also in this third position of the lock ring, the fingers of the handknob are uncovered permitting the handknob to be removed from the splined stem and replaced in a new circumferential position. This capability of adjusting both the handknob position and the lock ring index position enables an optimum viewing arrangement to be fixed.

DETAILED DESCRIPTION OF THE INVENTION

Figure 1:
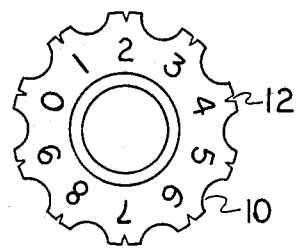
FIG. 1 is an end view of the handknob.

Referring to FIG. 1, handknob 10 is shown as having calibration marks labeled as "0" through "9", and identified by notches 12 in the handknob protuberances.

Figure 2:
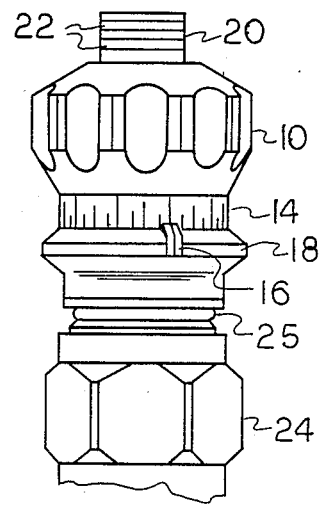
FIG. 2 is a side view of the handknob assembly and a portion of a valve body to which it is attached.

In FIG. 2 the calibration marks of FIG. 1 are shown continuing down the skirt 14 of handknob 10 with subdivision calibration marks also shown on skirt 14. Obviously the number of calibration marks used is a matter of choice and design. Index 16 on lock ring 18 can be set to any circumferential position for optimum viewing. For example, if a valve is oriented horizontally it may be convenient to have the zero position at the vertical top location for easy viewing. As will be discussed later, handknob 10 may also be removed and repositioned to put the "0" calibration mark opposite the index. Typically, the valve will first be fully closed and then the desired positions of handknob 10 and lock ring index 16 will be set. Stem 20 is shown as having circumferential calibrations 22 which are axially, evenly spaced. These calibrations are spaced so that each calibration represents one full turn of handknob 10, although other spacings may also be used if desired. With the valve fully closed, the top of stem 20 would be flush with the end of handknob 10. Valve body 24 is fixed and may be any of several types of valves. O-ring 25 provides a seal for the handknob assembly and may be of elastomeric material.

Figure 3:
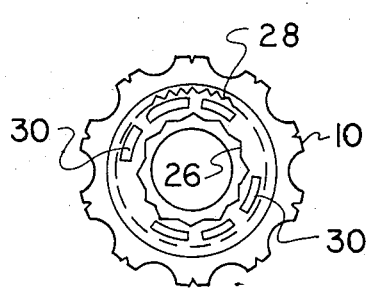
FIG. 3 is a view of the handknob from the other end.
Figure 4:
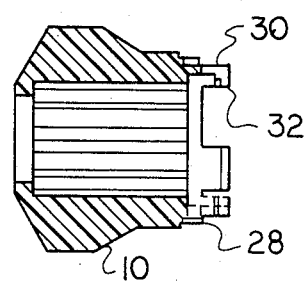
FIG. 4 is a side view of the handknob in cross-section.

FIG. 3 shows handknob 10 from the end opposite to FIG. 1, while FIG. 4 shows the side cross-section of the handknob. In the illustrated embodiment, a 12 point socket 26 has been formed in handknob 10. Stem 20 of FIG. 2 may be conveniently machined from hexagonal stock of aluminum or the like, leaving a portion of the original stock cross-section to act as a splined shaft which will move in socket 26. Handknob 10 may be repositioned at 30 degree circumferential intervals on the hexagonal portion of stem 20 so that the "0" indicating position will never be more than 15 degrees from the desired optimum. Of course a finer handknob to stem adjustment is possible by changing the polygonal relationship.

Handknob 10 has a serrate edge 28 which is inset from skirt 14, and a plurality of axially extending fingers 30 which terminate in inwardly extending lugs 32 (lugs 32 are not shown in FIG. 3). Fingers 30 will be bent radially outwardly in removing and repositioning handknob 10 so that handknob 10 cannot be fabricated from brittle material. A glass filled nylon has been used for both handknob 10 and lock ring 18, although other materials may also be used. As can be seen in FIG. 3, six fingers 30 have been used in this embodiment. Two fingers have been omitted at opposite positions to facilitate removal of handknob 10.

Figure 5:
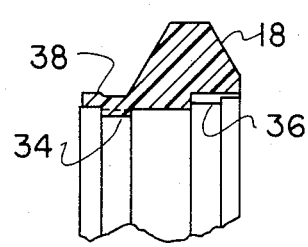
FIG. 5 is a fragmentary side view of the lock ring in cross-section.
Figure 6:
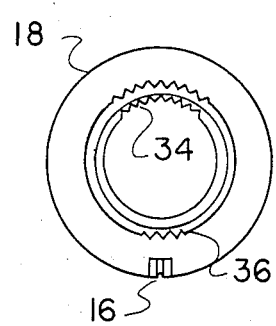
FIG. 6 is an end view of the lock ring in cross-section.

Lock ring 18 is shown in cross-section in FIG. 5 and from the end in FIG. 6. Lock ring 18 has a first internal serrate edge 34 which is designed to engage serrations on fixed valve body 24. Lock ring 18 also has a second internal serrate edge 36 which is designed to engage serrate edge 28 of handknob 10. Lock ring 18 also has axially extending lip 38 which will abut O-ring 25 of FIG. 2 and be detented by it. Index 16 will typically be molded as part of lock ring 18.

The use of serrate edges is one way of achieving a splined arrangement which will permit relative axial movement while the serrate edges are engaged, but will prevent relative rotational movement until the edges are disengaged.

Figure 7:
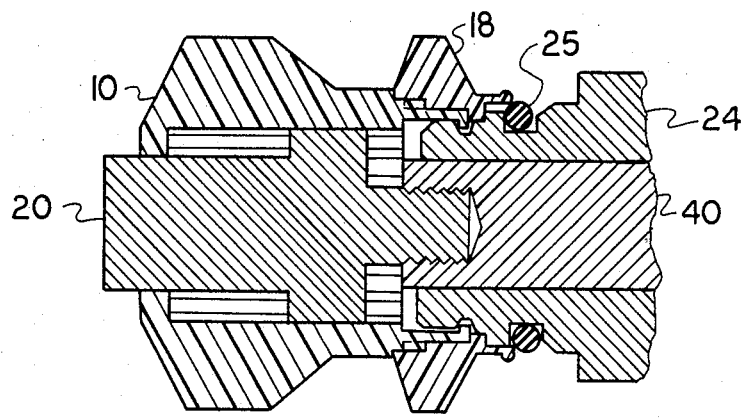
FIG. 7 is a side view of the handknob assembly and a portion of a valve body to which it is attached in cross-section.

FIG. 7 shows fixed valve body 24 with valve control stem 40 therein. Handknob 10 is mounted on stem 20 which is splined for axial movement in handknob 10 in response to axial movement of valve control stem 40. Handknob 10 is locked to valve body 24 as will be described with reference to FIG. 8.

Figure 8:
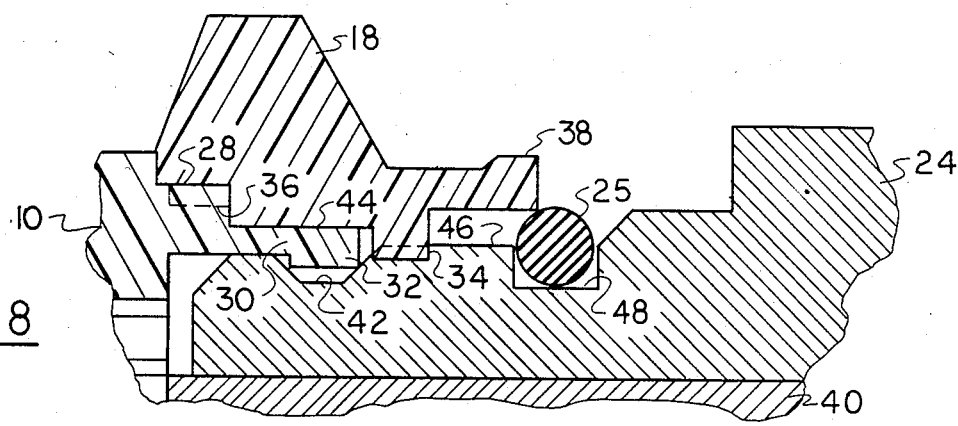
FIG. 8 is a detail of FIG. 7 with the lock ring in its first position.

FIG. 8 shows valve body 24 containing circumferential groove 42 in which lug 32 of finger 30 is positioned. The inner circumference 44 of lock ring 18 is located about the outer surface of finger 30 preventing lug 32 from moving out of groove 42 and so locking handknob 10 to valve body 24. In addition, serrate edge 28 of handknob 10 and serrate edge 36 of lock ring 18 are engaged. This prevents handknob 10 from being rotated because serrate edge 34 of lock ring 18 is engaged with serrate edge 46 of fixed valve body 24. Movement of lock ring 18 to the right is detented by O-ring 25 which is positioned in groove 48 of valve body 24. O-ring 25 abuts lip 38 of lock ring 18 and resists accidental axial movement of lock ring 18.

Figure 9:
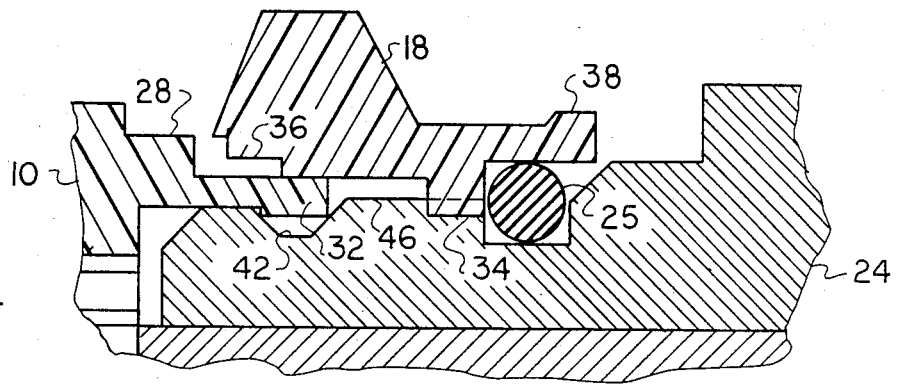
FIG. 9 is a detail of FIG. 7 with the lock ring in its second position.

If an operater reaches beyond handknob 10 and pushes lock ring 18, the resistance provided by O-ring 25 can be overcome and the handknob assembly will be in the position shown in FIG. 9. In this position handknob serrate edge 28 and lock ring serrate edge 36 are disengaged so that handknob 10 can be rotated to adjust the opening of the valve. However, lug 32 is still held in groove 42. Serrate edge 34 of lock ring 18 remains engaged with serrate edge 46 of valve body 24 so that lock ring 18 cannot be rotated.

Figure 10:
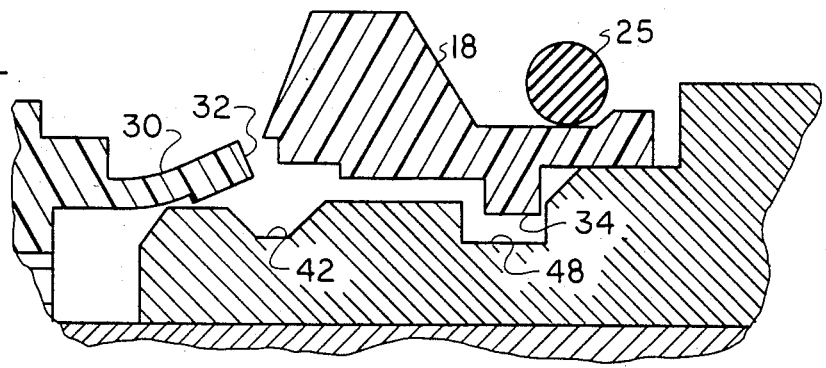
FIG. 10 is a detail of FIG. 7 with the lock ring in its third postion.

FIG. 10 shows the disassembly position of the handknob assembly. O-ring 25 has been pried out of groove 48 using a paper clip or the like and has been placed temporarily around lock ring 18. This permits lock ring 18 to be moved so that serrate edge 34 is now in groove 48 and lock ring 18 may be rotated to any desired circumferential position. Lug 32 is no longer held in groove 42 so that handknob 10 can now be removed from its position on the handknob stem and replaced in a desired new circumferential location. The repositioning of handknob 10 and index 16 of lock ring 18 is performed without rotation of the control stem of the valve. Thus if a new valve is installed on a piece of equipment and the "0" position is not located in the most desired viewing position, both the index and the calibrated handknob may be rotated to a more desirable position and then locked in this new position.

The handknob assembly has two injection molded parts which require no secondary manufacturing operations—the handknob and lock ring—the stem, which can be produced on an automatic screw machine, and the commercially available O-ring. Thus a calibrated handknob assembly has been provided which is easy to produce and simple in operation and requires no special tools for assembly and disassembly.

Although a calibrated handknob assembly in accordance with the invention has been illustrated and described, it will be evident that changes and modifications can be made without departing from the spirit of the invention and the scope of the appended claims.

I claim:

1. A calibrated handknob assembly for use with a valve having a control stem comprising:

a stem having spaced circumferential calibrations at one end, means for securing it to said control stem at the other end and an intermediate splined section;

a handknob having circumferentially spaced calibrations, a splined passage for said intermediate splined section of said stem and a calibrated stem passage through which the calibrated end of said stem may protrude; and a lock ring slidably positioned on the exterior of said handknob, said lock ring having an index mark and a position in which said index mark may be rotated to any desired rotational position and in which said handknob may be completely removed from said stem and replaced in a new rotational position when said locking ring has been slidably disengaged from said handknob to a position on said valve.

2. A calibrated handknob assembly for use with a valve having a control stem in accordance with claim 1 wherein:
said lock ring has a position in which said handknob is prevented from rotating.

3. A calibrated handknob assembly for use with a valve having a control stem in accordance with claim 2 further including:
detent means resisting movement of said lock ring from said position in which said handknob is prevented from rotating.

4. A calibrated handknob assembly for use with a valve having a control stem in accordance with claim 3 wherein:
said detent means prevents movement of said lock ring to said position in which said index mark may be rotated to any desired rotational position and in which said handknob may be removed from said stem and replaced in a new rotational position.

5. A calibrated handknob assembly for use with a valve having a control stem in accordance with claim 4 wherein:
said detent means is an elastomeric O-ring.

6. A calibrated handknob assembly for use with a valve having a control stem in accordance with claim 1 wherein;
said handknob has at least one axially extending finger having an inwardly extending lug;
said valve has a lug receiving groove in which said lug may be positioned; and
said lock ring may be positioned to prevent said lug from leaving said lug receiving groove whereby said handknob is locked to said valve.

7. A calibrated handknob assembly for use with a valve having a control stem comprising:
a stem having spaced circumferential calibrations at one end, means for securing it to said control stem at the other end and an intermediate splined section;
a handknob having circumferentially spaced calibrations, a splined passage for said intermediate splined section of said stem and a calibrated stem passage through which the calibrated end of said stem may protrude; and
a lock ring slidably positioned on the exterior of said handknob, said lock ring having a first position in which said lock ring is free to rotate and said handknob may be completely removed from said stem and replaced in a new rotational position when said locking ring has been slidably disengaged from said handknob to a position on said valve.

8. A calibrated handknob assembly for use with a valve having a control stem in accordance with claim 7 wherein:
said lock ring has a second position in which said lock ring is prevented from rotating and said handknob is secured to it.

9. A calibrated handknob assembly for use with a valve having a control stem in accordance with claim 8 wherein:
said lock ring has a third position in which said lock ring is prevented from rotating but said handknob is free to rotate.

10. A calibrated handknob assembly for use with a valve having a control stem in accordance with claim 9 further including:
detent means resisting movement of said lock ring from said second position.

11. A calibrated handknob assembly for use with a valve having a control stem in accordance with claim 10 wherein:
said detent means prevents movement of said lock ring to said first position.

12. A calibrated handknob assembly for use with a valve having a control stem in accordance with claim 11 wherein:
said detent means is an elastomeric O-ring.

13. A calibrated handknob assembly for use with a valve having a control stem in accordance with claim 12 wherein:
said valve has a groove and said O-ring is positioned in said groove.

14. A calibrated handknob assembly for use with a valve having a fixed body with a groove and an outer serrate edge thereon and a control stem moveable in said fixed valve body comprising:
a stem secured to said control stem and having axially spaced circumferential graduations along one end;
a handknob having an axial passage therethrough for said stem, a plurality of circumferentially spaced graduations thereon, an outer serrate edge and a plurality of axially extending fingers terminating in inwardly extending lugs;
a lock ring having first and second inner serrate edges and first, second and third axial positions;
in said first axial position said first lock ring serrate edge and said valve serrate edge are engaged, said second lock ring serrate edge and said handknob serrate edge are engaged, said lugs are positioned in said valve groove and said handknob fingers are restricted from radial movement, whereby said handknob is prevented from turning and from being removed from said stem;
in said second axial position said first lock ring serrate edge and said valve serrate edge are engaged, said second lock ring serrate edge and said handknob serrate edge are disengaged, said lugs are positioned in said valve groove and said handknob fingers are restricted from radial movement, whereby turning said handknob will change the valve opening and cause a corresponding change in the length of said stem extending through said handknob passage and said handknob is prevented from being removed from said stem; and
in said third axial position said first lock ring serrate edge and said valve serrate edge are disengaged, said second lock ring serrate edge and said handknob serrate edge are disengaged and said handknob fingers are free to move radially outwardly, whereby the circumferential position of said lock ring can be changed and said handknob may be removed and repositioned without causing the valve opening to change.

15. A calibrated handknob assembly in accordance with claim 14 further including:
removeable lock ring axial movement control means providing resistance to movement of said lock ring from said first axial position to said second axial position and preventing movement of said lock ring from said second axial position to said third axial position.

16. A calibrated handknob assembly in accordance with claim 15 wherein:
said removeable lock ring axial movement control means is an elastomeric O-ring.

* * * * *